United States Patent
Kennedy et al.

(10) Patent No.: US 11,803,857 B2
(45) Date of Patent: *Oct. 31, 2023

(54) METHOD AND SYSTEM FOR IMPLEMENTING CHARGEBACKS ON A DISTRIBUTED LEDGER SYSTEM

(71) Applicant: MASTERCARD INTERNATIONAL INCORPORATED, Purchase, NY (US)

(72) Inventors: Dennis Michael Kennedy, St. Louis, MO (US); Michael L. Grazio, Rye Brook, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/570,027

(22) Filed: Jan. 6, 2022

(65) Prior Publication Data

US 2022/0129897 A1      Apr. 28, 2022

Related U.S. Application Data

(63) Continuation of application No. 15/581,088, filed on Apr. 28, 2017, now Pat. No. 11,238,460.

(51) Int. Cl.
*G06F 40/00* (2020.01)
*G06Q 20/40* (2012.01)
(Continued)

(52) U.S. Cl.
CPC .......... *G06Q 20/407* (2013.01); *G06Q 20/02* (2013.01); *G06Q 20/24* (2013.01); *G06Q 20/405* (2013.01); *G06Q 20/409* (2013.01)

(58) Field of Classification Search
None
See application file for complete search history.

(56) References Cited

U.S. PATENT DOCUMENTS

2012/0202525 A1    8/2012   Pettini
2012/0303525 A1*  11/2012   Sahadevan ............. G06Q 30/04
                                                      705/44
(Continued)

FOREIGN PATENT DOCUMENTS

WO   WO 2015/171580   * 11/2012   ............. H04L 29/06
WO      2015171580 A1   11/2015

OTHER PUBLICATIONS

"Atomic Cross-Chain Trading", Bitcoin Wiki, en_bitcoin.it/w/index.php?title-Atomic_cross-chain_trading&oldid=47993 retrieved on Apr. 4, 20117], Jun. 8, 2014, pp. 1-3.*

(Continued)

*Primary Examiner* — Olabode Akintola
(74) *Attorney, Agent, or Firm* — Panitch Schwarze Belisario & Nadel LLP

(57) ABSTRACT

A method for recording chargebacks in blockchain transactions includes: storing a blockchain comprised of a plurality of blocks, each block being comprised of a block header and data values, where each data value includes a unique transaction identifier and data corresponding to a processed payment transaction; receiving a chargeback request including a specific transaction identifier corresponding to a unique transaction identifier included in a data value in the blockchain; generating a first transaction data value comprising the specific transaction identifier, a first new unique transaction identifier, and data indicating that a chargeback is requested for the corresponding payment transaction; transmitting the first transaction data value to a blockchain node; generating a second transaction data value comprising the specific transaction identifier, a second new unique transaction identifier, and data indicating a resolution for the chargeback for the corresponding payment transaction; and (Continued)

transmitting the second transaction data value to a blockchain node.

20 Claims, 5 Drawing Sheets

(51) Int. Cl.
*G06Q 20/24* (2012.01)
*G06Q 20/02* (2012.01)

(56) References Cited

U.S. PATENT DOCUMENTS

| | | | | |
|---|---|---|---|---|
| 2016/0148212 | A1* | 5/2016 | Dimmick | G06F 21/6245 |
| | | | | 705/44 |
| 2016/0342989 | A1* | 11/2016 | Davis | G06Q 20/3674 |
| 2016/0350756 | A1* | 12/2016 | Shepard | G06Q 20/047 |
| 2017/0048234 | A1 | 2/2017 | Lohe et al. | |
| 2017/0109735 | A1 | 4/2017 | Sheng et al. | |
| 2017/0109748 | A1* | 4/2017 | Kote | G06Q 20/065 |
| 2018/0089436 | A1* | 3/2018 | Smith | H04L 9/3236 |
| 2018/0143995 | A1* | 5/2018 | Bailey | G06F 21/64 |
| 2018/0276666 | A1* | 9/2018 | Haldenby | G06Q 20/20 |
| 2019/0179672 | A1 | 6/2019 | Christidis et al. | |

OTHER PUBLICATIONS

"Atomic Cross-Chain Trading", Bitcoin Wiki, en.bitcoin.il/w/index. php?tille-Atomic_cross-chain_trading&oldid=47993, retrieved on Apr. 4, 20117], Jun. 8, 2014, pp. 1-3.

Wilkinson, "Introduction to Micropayment Channels", Apr. 13, 2016, pp. 1-4.

International Search Report and the Written Opinion of the International Searching Authority (PCT/ISA/210 and PCT/ISA/237) dated Jun. 11, 2018, by the European Patent Office in corresponding International Application No. PCT/US2018/025021.

* cited by examiner

METHOD AND SYSTEM FOR IMPLEMENTING CHARGEBACKS ON A DISTRIBUTED LEDGER SYSTEM

FIELD

The present disclosure relates to the implementation of chargebacks on a distributed ledger system, more specifically the recording of chargebacks and chargeback resolutions in a blockchain to enable such data to be immutable and publicly accessible to assist in the identification of fraudulent consumers and merchants and facilitate stronger transactions.

BACKGROUND

Credit cards and other similar types of payment instruments have enabled consumers to purchase items on credit when they may be otherwise unable to. In addition, over time such payment instruments have provided additional benefits to consumers as well, such as rewards and loyalty programs, the ability to fund transactions without having to carry cash, etc. Another benefit that has arisen from the use of credit cards and other similar payment instruments is the chargeback. A chargeback is a demand placed on a merchant or other seller by the issuing institution of a credit card, demanding that the merchant refund a transaction. Often times, chargebacks are requested by a consumer when a merchant refuses to provide a refund directly to the consumer, despite the consumer having a valid reason for such a refund. Chargebacks provide the consumer with additional recourse, and helps level the playing field between merchants and consumers.

However, while chargebacks can be a beneficial tool for consumers, there can also be risks associated therewith. For instance, a single consumer may regularly request chargebacks using questionable justifications, as a way of avoiding payment to merchants for expensive items. As such, the consumer may be engaging in fraudulent activity, which takes advantage of merchants. On the other hand, chargebacks can also reveal merchants that take advantage of their consumers. For example, a merchant with whom chargebacks are regularly requested may be regularly providing defective products or otherwise mistreating their consumers, resulting in the myriad of chargeback requests. As a result, keeping track of chargebacks can be beneficial for both consumers and merchants, to reduce or otherwise monitor instances of fraud.

However, there currently exists no system dedicated to the storage and tracking of data related to chargebacks that is both reliable and accessible to multitudes, likely primarily due to the difficulty of providing access and the ability to add to the data, but at the same time keeping it secure form intrusion and alteration of prior information by those adversely affected, for instance. It does not appear that there are prior systems that provide chargeback information in a fairly open forum, and prior systems that provide some level of data security do so by providing user-specific rights such that the user only can see and possibly alter certain data records, meaning that the assigned rights have to be tracked and the physical computers holding such databases with a security layer or layers, are nevertheless capable of being hacked. Thus, there is a need for a technical solution to enable data related to chargebacks to be stored in a manner that makes such data immutable and decentralized to ensure integrity and accuracy of the data, and such that the data is available to any interested entity to increase utility and help combat fraud and mistreatment.

SUMMARY

The present disclosure provides a description of systems and methods for recording chargebacks in blockchain transactions. Payment transaction data may be stored as data values inside of a blockchain, where such data may include, for instance, identification values associated with a transaction account and merchant involved in the transaction. When a chargeback is requested, an entry may be made into the blockchain that references the related transaction, as well as indicates that a chargeback has been requested. Once the chargeback is resolved, another entry may be made that indicates the resolution of the chargeback for that transaction. As such, there may be an immutable record but possibly widely accessible of the history of that transaction through the chargeback process. On the whole, such data may indicate repeated instances of chargebacks against a particular merchant, repeated instances of chargebacks initiated by a specific transaction account, success rates of such chargebacks, etc., in a manner that cannot be modified or tampered with. As a result, the system may protect genuine consumers and merchants, while exposing those involved in nefarious activities.

A method for recording chargebacks in blockchain transactions includes: storing, in a memory of a processing server, a blockchain, wherein the blockchain includes a plurality of blocks, each block being comprised of at least a block header and one or more data values, where each data value includes at least a unique transaction identifier and data corresponding to a processed payment transaction; receiving, by a receiving device of the processing server, a chargeback request, wherein the chargeback request includes a specific transaction identifier corresponding to a unique transaction identifier included in a specific data value in the blockchain; generating, by a generation module of the processing server, a first transaction data value comprising at least the specific transaction identifier, a first new unique transaction identifier, and data indicating that a chargeback is requested for the corresponding payment transaction; electronically transmitting, by a transmitting device of the processing server, the first transaction data value to a blockchain node; generating, by the generation module of the processing server, a second transaction data value comprising at least the specific transaction identifier, a second new unique transaction identifier, and data indicating a resolution for the chargeback requested for the corresponding payment transaction; and electronically transmitting, by the transmitting device of the processing server, the second transaction data value to a blockchain node.

A system for recording chargebacks in blockchain transactions includes: a memory of a processing server configured to store a blockchain, wherein the blockchain includes a plurality of blocks, each block being comprised of at least a block header and one or more data values, where each data value includes at least a unique transaction identifier and data corresponding to a processed payment transaction; a receiving device of the processing server configured to receive a chargeback request, wherein the chargeback request includes a specific transaction identifier corresponding to a unique transaction identifier included in a specific data value in the blockchain; a generation module of the processing server configured to generate a first transaction data value comprising at least the specific transaction identifier, a first new unique transaction identifier, and data indicating that a chargeback is requested for the corresponding payment transaction; and a transmitting device of the processing server configured to electronically transmit the first transaction data value to a blockchain node, wherein the generation module of the processing server is further configured to generate a second transaction data value comprising at least the specific transaction identifier, a second new unique transaction identifier, and data indicating a resolution for the chargeback requested for the corresponding payment transaction, and the transmitting device of the processing server is further configured to electronically transmit the second transaction data value to a blockchain node.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
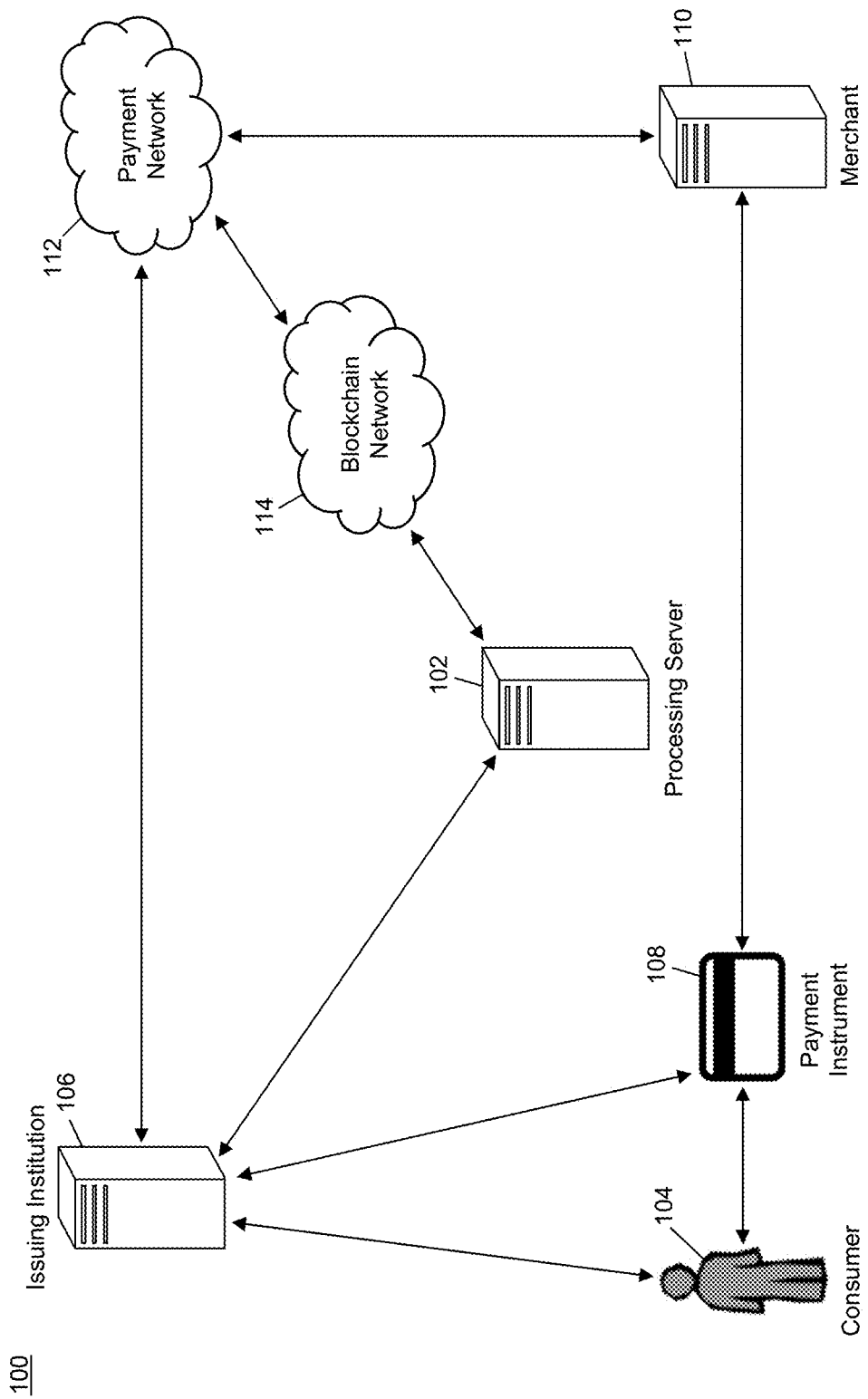
FIG. 1 is a block diagram illustrating a high level system architecture for recording chargebacks in blockchain transactions in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Recording of Chargeback Data Via Blockchain

FIG. 1 illustrates a system 100 for the recording of data associated with chargebacks for payment transactions as blockchain transactions in a blockchain.

The system 100 may include a processing server 102. The processing server 102, discussed in more detail below, may be configured to generate blockchain transactions for chargebacks that are requested for electronic payment transactions. In the system 100, a consumer 104 may conduct an electronic payment transaction for which a chargeback is later requested. The system 100 may include an issuing institution 106. The issuing institution 106 may be a financial institution, such as an issuing bank, or other entity that is configured to issue payment instruments for transaction accounts for use in funding electronic payment transactions. The issuing institution 106 may be issue a transaction account to the consumer 104, and as part of the issuance of the transaction account, may issue a payment instrument 108 associated with that transaction account to the consumer 104. The payment instrument 108 may be a credit card or any other suitable type of payment instrument for which chargebacks may be requested for transactions funded therewith.

The consumer 104 may engage in an electronic payment transaction with a merchant 110. As part of the conducting of the electronic payment transaction, the consumer 104 may provide the payment instrument 108 to the merchant 110, which may read or otherwise obtain payment credentials therefrom. The merchant 110 may initiate processing of the payment transaction, which may include the submission of the payment credentials associated with the transaction account and other transaction data to a payment network 112. Such additional transaction data may include, for instance, a transaction amount, transaction time, transaction date, geographic location, currency type, merchant identification number, product data, consumer data, merchant data, issuer data, acquirer data, loyalty data, reward data, offer data, etc.

The payment network 112 may receive the data from the merchant 110 using payment rails associated therewith. In some embodiments, the merchant 110 may submit the data directly to the payment network 112. In other embodiments, the transaction data may be submitted via one or more intermediate entities, such as an acquiring financial institution and/or gateway processor. In some cases, the data may be stored in a transaction message that is generated by the merchant 110 or an intermediate entity. The transaction message may be a specially formatted data message that is formatted pursuant to one or more standards governing the exchange of financial transaction messages, such as the International Organization of Standardization's ISO 8583 or ISO 20022 standards. In such cases, the transaction message may include a plurality of data elements configured to store the transaction data, as well as a message type indicator indicating a type for the transaction message, such as an authorization request, authorization response, chargeback request, chargeback response, etc.

Upon receipt of the transaction data, the payment network 112 may process the payment transaction using traditional methods and systems. Such processing may include the forwarding of transaction data to the issuing institution 106, which may approve or deny the payment transaction based on traditional factors, such as the amount of credit available to the transaction account (e.g., associated with the payment instrument 108 presented for payment) compared to the transaction amount. Following the successful processing of the payment transaction, the payment network 112 may provide at least a portion of the transaction data to a blockchain network 114 for inclusion in a blockchain. In some cases, the payment network 112 may provide the transaction data to a node comprising the blockchain network 114. In other cases, the payment network 112 itself may operate as a node in the blockchain network 114. In yet other cases, the payment network 112 may provide the transaction data to a third party, such as the processing server 102, for submission to a node in the blockchain network 114. In some embodiments, the processing server 102 may be a part of the payment network 112 and may perform communications with the blockchain network 114 on behalf of the payment network 112. In some instances, the processing server 102 may be a node in the blockchain network 114.

The transaction data for the payment transaction may be included in a data value that is added to the blockchain. The blockchain may be comprised of a plurality of blocks, where each block includes a block header and one or more data values, with each data value being associated with a processed payment transaction. Each block header may include at least a timestamp, a reference value to the prior (e.g., based on timestamp) block in the blockchain, and a reference value to the data value(s) included in its same block. In an exemplary embodiment, the reference value to the prior block may be a hash value of the block header of the prior block, which may be generated via the application of one or more hashing algorithms to the block header. Similarly, the reference value to the data value(s) included in a block may be a hash value of said data values, which may be generated via the application of one or more hashing algorithms to the data value(s). The storage of the reference values in a block header may ensure immutability of all data stored in the blockchain, as the modification to any data included in a single data value or block header would result in a hashing yielding a different hash value, which would propagate through every subsequent block header, thus revealing any attempted modification to the blockchain. In addition, the decentralized nature of the blockchain, with the blockchain data being stored at every node comprising the blockchain network 114, ensures that even a successful attempt at modifying the blockchain would be detected unless every single node were to be compromised.

Following the successful processing of the payment transaction involving the consumer 104 and the merchant 110, a block may be added to the blockchain that includes a data value corresponding to that payment transaction. The consumer 104 may later on decide that a chargeback is necessary for the payment transaction, such as due to a defective product for which the merchant 110 refuses to issue a refund. The consumer 104 may contact the issuing institution 106 and request a chargeback for the specific payment transaction. The issuing institution 106 may then submit a chargeback request to the processing server 102, which may be electronically transmitted directly to the processing server 102 or via one or more intermediaries, such as the payment network 112. In some cases, the processing server 102 may be configured to initiate the chargeback process directly. In other cases, the issuing institution 106 may use traditional processes for initiation of the chargeback process, while the processing server 102 may be utilized for interaction with the blockchain and storage of the related data.

The chargeback request submitted to the processing server 102 may include at least a specific transaction identifier. The transaction identifier may be a unique value associated with a processed electronic payment transaction, such as a number, alphanumeric value, hexadecimal value, or other suitable type of unique value. The transaction identifier for a payment transaction may be generated by the payment network 112 or other entity involved in the transaction during processing, and may be stored in the data value in the blockchain that corresponds to the payment transaction. The processing server 102 may receive the chargeback request and may generate a new transaction data value for storage in the blockchain. The new transaction data value may include at least the specific transaction identifier for the payment transaction for which the chargeback is being requested, as well as data indicating that a chargeback has been requested for the payment transaction. The data may include, for instance, a status flag, a data value, a reference to the chargeback transaction itself (e.g., an additional transaction identifier), and/or data related to the chargeback, such as the time and/or date requested, time and/or date initiated, amount requested, etc.

The processing server 102 may then submit the new transaction data value to a blockchain node for inclusion in a subsequent block to be added to the blockchain. In embodiments where the processing server 102 is a node in the blockchain network 114, the processing server 102 may retain the transaction data value and include it in a new block that is to be verified by other nodes and then added into the blockchain. Once added, the blockchain may thus indicate that a chargeback has been requested for the specific payment transaction.

Once resolution of the chargeback occurs, the processing server 102 may be notified accordingly (e.g., by the issuing institution 106, payment network 112, merchant 110, or other entity, as applicable). The notification may include the specific transaction identifier related to the corresponding payment transaction and/or the reference to the chargeback itself, and also include an indication of the resolution of the chargeback. The indication may indicate, for instance, that the chargeback was successful or failed. In instances where the chargeback failed (e.g., was denied), the indication may also include a reason code that provides a reason for the failure. The processing server 102 may then generate another new transaction data value, which may include the specific transaction identifier and the data indicating the resolution of the chargeback. In some cases, the reason code or other data associated with the resolution of the chargeback may be included in the new transaction data value. The processing server 102 may then submit the new transaction data value to a node in the blockchain network 114 for inclusion in a subsequent block added to the blockchain.

In some embodiments, the processing server 102 may utilize smart contracts for the generation of the second new transaction data value. A smart contract may be a script or other computer protocol that may be included in a data value in the blockchain that is self-executed once one or more predetermined conditions have been met. In the system 100, that processing server 102 may include a smart contract in the first new transaction data value that is submitted to the blockchain network 114 that includes the indication that a chargeback is requested for the payment transaction. The smart contract may be configured to self-execute once the chargeback has been resolved, such as by monitoring correspondence received by the processing server 102 or issuing institution 106, upon the change in a data field that is modified by the processing server 102 upon receipt of the resolution of the chargeback, etc. The execution of the smart contract may result in the generation of the second transaction data value that includes the data indicating the resolution of the chargeback, and may further result in the submission of the second transaction data value to a node in the blockchain network 114. As a result, the smart contract may be utilized by the processing server 102 to increase efficiency in the addition of the resolution data for the chargeback into the blockchain.

In some embodiments, the system 100 may utilize multiple blockchains for performing of the functions discussed herein. In such an embodiment, the blockchain network 114 may utilize a first blockchain for storage of data values corresponding to processed payment transactions, and may utilize a second blockchain for storage of data values corresponding to chargebacks for the payment transactions. In such instances, the data values included in the second blockchain may include a reference value to the corresponding data value in the first blockchain, and/or a reference to the first blockchain, such as a blockchain identification value. In these embodiments, the second blockchain may be comprised solely of chargeback data, which may result in quicker identification of trends involving chargebacks for consumers 104 and merchants 110.

The methods and systems discussed herein enable the storage of data associated with chargebacks for electronic payment transactions in an immutable and decentralized manner, facilitated via a blockchain. The immutable and decentralized storage of the chargeback data ensures that the data is accurate and cannot be tampered with, increasing the integrity and security of the data. The easily accessible storage of chargeback data for a vast number of payment transactions can facilitate the identification of consumers 104 that abuse the chargeback process, as an entity (e.g., the issuing institution 106 or a merchant 110) may identify that a single consumer 104 participates in a large number of chargebacks, particularly in cases where the chargebacks are often unsuccessful. Similarly, an issuing institution 106 or a payment network 112 may identify that a merchant 110 is often the target of an unusually large number of chargebacks by multiple consumers 104, which may result in decreased business for the merchant 110, and increase of fees charged for transactions involving the merchant 110, and other manners of recourse.

Processing Server

Figure 2:
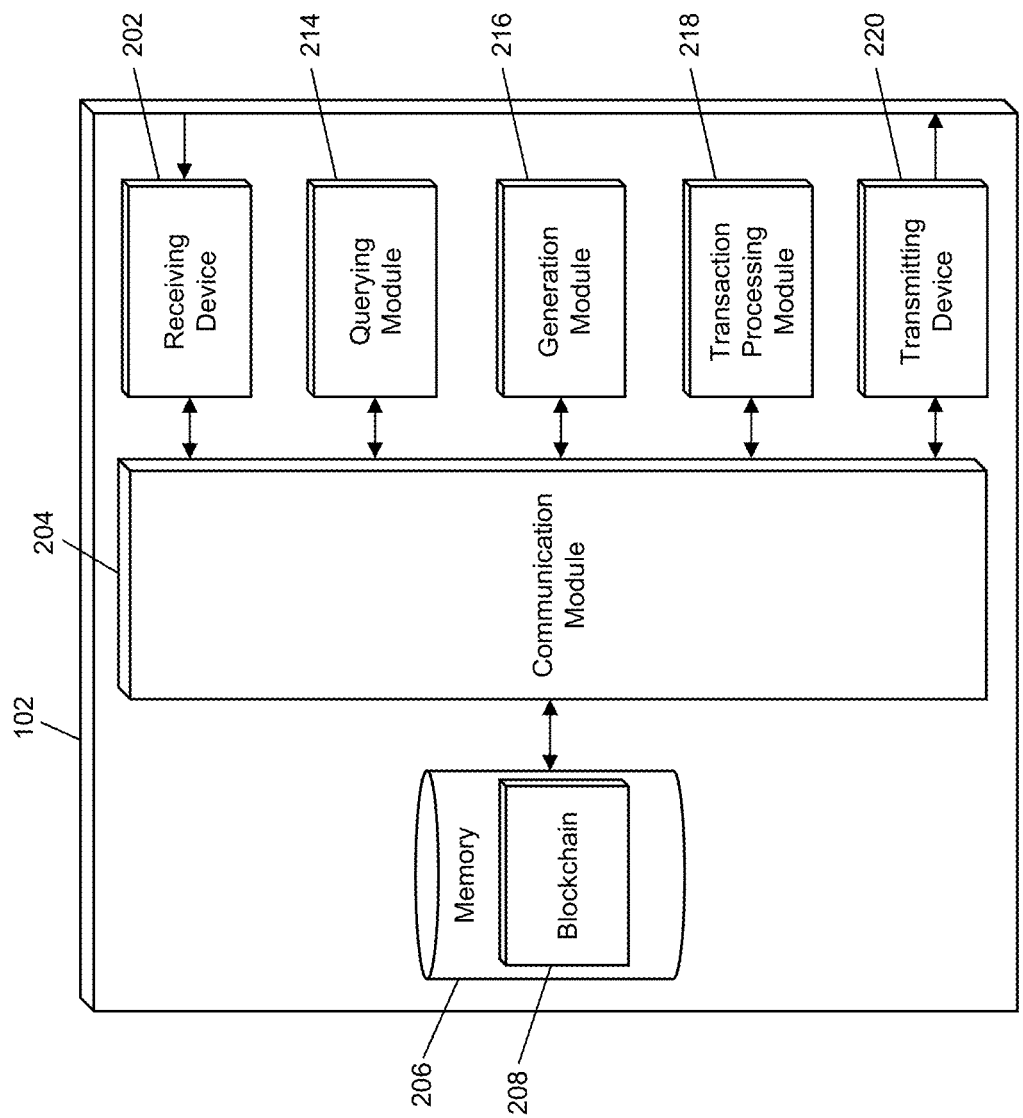
FIG. 2 is a block diagram illustrating the processing server of the system of FIG. 1 for the storage of chargeback data in blockchain transactions in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuing institutions 106, payment networks 112, blockchain networks 114, merchants 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 106 that are superimposed or otherwise encoded with chargeback requests, which may include at least a specific transaction identifier associated with a payment transaction corresponding to the chargeback request. The receiving device 202 may also be configured to receive data signals that are superimposed or otherwise encoded with chargeback resolution data, which may be electronically transmitted by the issuing institution 106 or another entity, such as the merchant 110 or payment network 112. The receiving device 202 may also be configured to receive data signals electronically transmitted by nodes in the blockchain network 114, which may be superimposed or otherwise encoded with blockchain data, such as the blocks comprising the blockchain and/or data included therein.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, transaction processing module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store a blockchain 208. As discussed above, the blockchain 208 may be comprised of a plurality of blocks, where each block may be comprised of at least a block header and one or more data values. Each block header may include a time stamp, a reference value referring to the preceding block in the blockchain, and a reference value referring to the one or more data values included in the respective block. The memory 206 may also be configured to store any additional data that may be used by the processing server 102 in performing the functions discussed herein, such as hashing algorithms for generating reference values for the blockchain, data used for the generation of smart contracts, communication data for communicating with issuing institutions 106, etc.

The processing server 102 may include a querying module 214. The querying module 214 may be configured to execute queries on databases to identify information. The querying module 214 may receive one or more data values or query strings, and may execute a query string based thereon on an indicated database, such as the memory 206, to identify information stored therein. The querying module 214 may then output the identified information to an appropriate engine or module of the processing server 102 as necessary. The querying module 214 may, for example, execute a query on the memory 206 to identify a data value stored in a block of the blockchain 208, which may include a specific transaction identifier associated with a payment transaction for which a chargeback is requested.

The processing server 102 may also include a generation module 216. The generation module 216 may be configured to generate data for the processing server 102 for use in performing the functions discussed herein. The generation module 216 may receive instructions as input, may generate data based on the instructions, and may output the generated data to one or more modules or engines of the processing server 102. For example, the generation module 216 may be configured to generate new transaction data values for inclusion in the blockchain, including a transaction data value that includes an indication that a chargeback has been requested for a payment transaction, as well as a transaction data value that includes an indication of a resolution of a chargeback requested for a payment transaction. In some embodiments, the generation module 216 may be further configured to generate smart contracts, which may be included in a data value added to the blockchain that includes an indication that a chargeback is requested for a payment transaction, and may be configured to self-execute once a resolution for that chargeback has been found, which may result in the generation of a subsequent data value that indicates said resolution for the chargeback.

In some embodiments, the processing server 102 may also include a transaction processing module 218. The transaction processing module 218 may be configured to perform the functions of the processing server 102 related to the processing of payment transactions, as discussed herein. For instance, the transaction processing module 218 may be configured to initiate chargebacks, identify chargeback resolutions, initiate payments or refunds related to successful chargebacks, etc. In cases where the processing server 102 may be a part of the payment network 112, the transaction processing module 218 may be configured to perform traditional functions related to the processing of payment transactions, such as transaction message routing, fraud scoring, etc.

In cases where the processing server 102 may be a part of the blockchain network 114 (e.g., may be a node thereof), the processing server 102 may include additional modules or engines associated with the performance as a node of the blockchain network 114. For instance, the generation module 216 may be configured to generate new blocks and new block headers, a hashing module may be included to generate reference values for inclusion in block headers, a verification module may be included to verify reference values and new blocks that are submitted (e.g., by other nodes) for inclusion to the blockchain, etc.

The processing server 102 may also include a transmitting device 220. The transmitting device 220 may be configured to transmit data over one or more networks via one or more network protocols. In some instances, the transmitting device 220 may be configured to transmit data to issuing institutions 106, blockchain networks 114, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to nodes in the blockchain network 114, which may be superimposed or otherwise encoded with data values for inclusion in blocks subsequently added to the blockchain. In some cases, data values may include smart contracts for self-execution, such as when a resolution has been found for a chargeback. In some embodiments, the transmitting device 220 may also be configured to electronically transmit data signals to issuing institutions 106, such as in instances where the processing server 102 is configured to initiate a chargeback on behalf of or upon instruction by the issuing institution 106, where such data signals may be superimposed or otherwise encoded with the chargeback resolution and any other data associated therewith.

Process for Storing Chargeback Data in Blockchain Data Values

Figure 3:
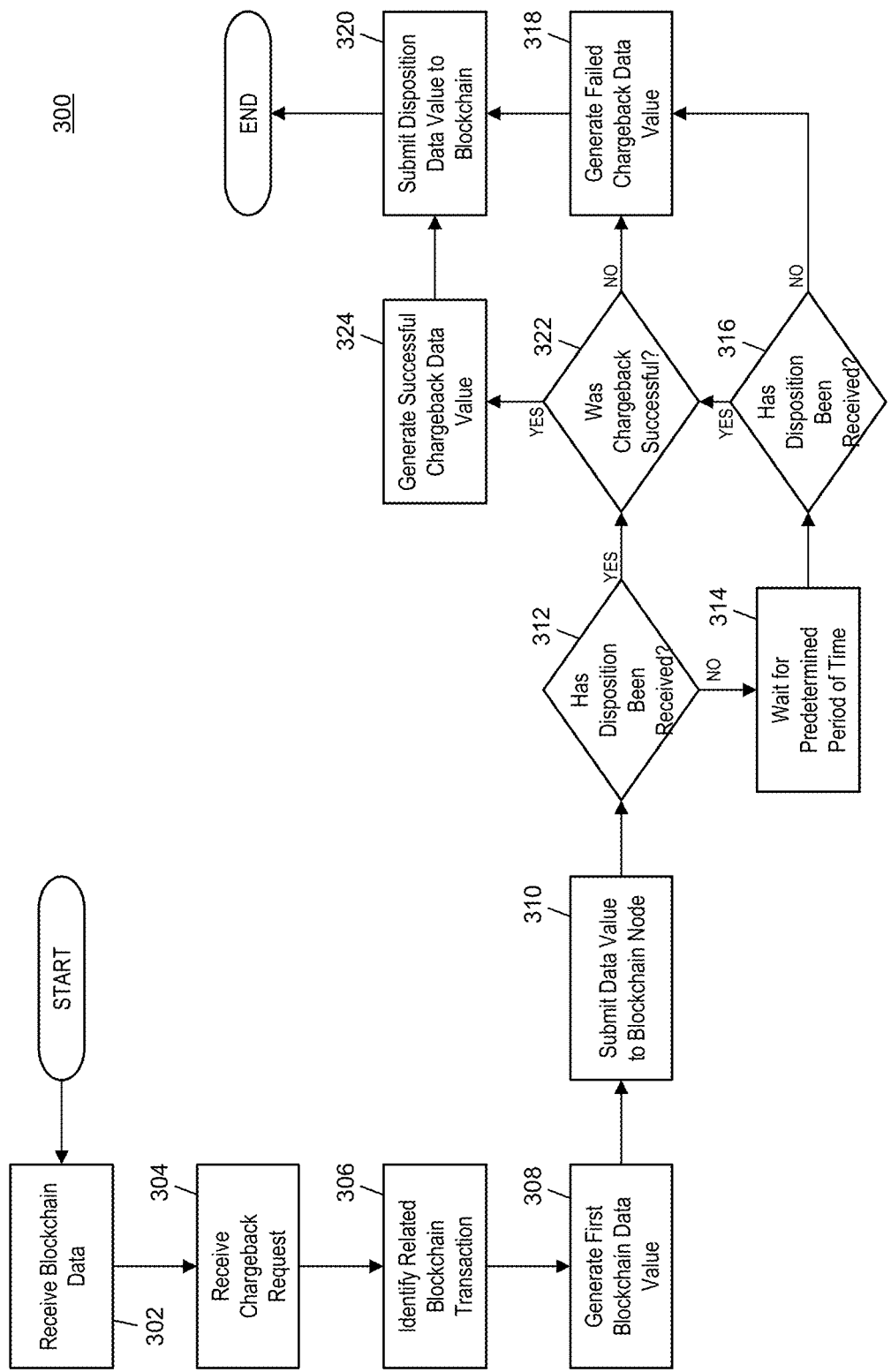
FIG. 3 is a flow diagram illustrating a process for recording chargeback data in blockchain transactions by the processing server of FIG. 2 in accordance with exemplary embodiments.

FIG. 3 illustrates a process 300 of the processing server 102 in the system 100 for the storage of data associated with a chargeback for an electronic payment transaction in data values included in the blockchain associated with the blockchain network 114.

In step 302, the receiving device 202 of the processing server 102 may receive blockchain data, such as may be electronically transmitted from a node in the blockchain network 114 using a suitable communication network and method. The blockchain data may include one or more blocks and the one or more data values included therein. In some cases, the querying module 214 of the processing server 102 may execute a query on the memory 206 to store the blockchain data therein, and/or to add the blockchain data to an existing blockchain 208 stored in the memory 206. In step 304, the receiving device 202 of the processing server 102 may receive a chargeback request submitted by an issuing institution 106. The chargeback request may include at least a specific transaction identifier associated with the payment transaction to which the chargeback request is related. In step 306, the querying module 214 of the processing server 102 may execute a query on the memory 206 to identify a blockchain transaction (e.g., its corresponding data value) in the blockchain 208 that includes the specific transaction identifier.

In step 308, the generation module 216 of the processing server 102 may generate a first blockchain data value. The first blockchain data value may include at least the specific transaction identifier as well as an indication that a chargeback has been requested for the related payment transaction. In some cases, an additional reference value may be included in the first blockchain data value, such as may refer to the blockchain transaction identified in step 306. For example, each data value may include its own unique identifier associated therewith. In such an example, the first blockchain data value may include its own unique identifier and the unique identifier associated with the earlier identified blockchain transaction, in addition to the indication that a chargeback has been requested. In step 310, the transmitting device 220 of the processing server 102 may electronically transmit the first blockchain data value to a node in the blockchain network 114 for inclusion in a subsequent block added to the blockchain.

In step 312, the processing server 102 may determine if a disposition of the chargeback has been received. The determination may be based on, for instance, the monitoring of communications received via the receiving unit 202 to determine if any include a resolution of the chargeback associated with the specific transaction identifier. If no disposition has been received, then, in step 314, the processing server 102 may continue to wait for a disposition for a predetermined period of time. The predetermined period of time may be set by any entity involved in the chargeback, such as the issuing institution 106, processing server 102, payment network 112, and may be a time that the processing server 102 may wait for resolution of the chargeback before assuming that the chargeback has failed or will otherwise not be processed (e.g., the consumer 104 may withdraw their chargeback, the merchant 110 and consumer 104 may settle the chargeback, etc.). In step 316, the processing server 102 may again determine if the disposition of the chargeback has been received once the predetermined period of time has expired.

If the time has expired and still no disposition has been received for the chargeback, then, in step 318, the generation module 216 of the processing server 102 may generate a second blockchain data value that indicates that the chargeback failed. In such cases, the second blockchain data value may also include a reason code, which may indicate that the chargeback timed out (e.g., the predetermined period of time expired without a disposition being received). In step 320, the transmitting device 220 of the processing server 102 may electronically transmit the second blockchain data value to a node in the blockchain network 114 for addition into the blockchain.

If, in steps 312 or 316, the processing server 102 identifies that a disposition for the chargeback has been successfully received (e.g., via the receiving unit 202 thereof), then, in step 322, the processing server 102 may determine if the chargeback was successful based on the disposition. If the chargeback was unsuccessful, then the process 300 may proceed to step 318 where the second blockchain data value is generated that indicates that the chargeback has failed. In such cases, the second blockchain data value may also include a reason code, which may include a reason indicated in the disposition received by the processing server 102, if available. For instance, the reason code may be a code indicating that the merchant 110 issued a refund to the consumer 104 or replaced a defective product. If the chargeback was successful, then the process 300 may proceed to step 324, where the generation module 216 of the processing server 102 may generate a second blockchain data value that indicates that the chargeback was successful. Once the second blockchain data value has been generated, the process 300 may proceed to step 320 where the transmitting device 220 of the processing server 102 may electronically transmit the second blockchain data value to a node in the blockchain network 114 for inclusion in a subsequent block. The chargeback data may then be stored in the decentralized ledger in an immutable format for review by any interested entity.

Exemplary Method for Recording Chargebacks in Blockchain Transactions

Figure 4:
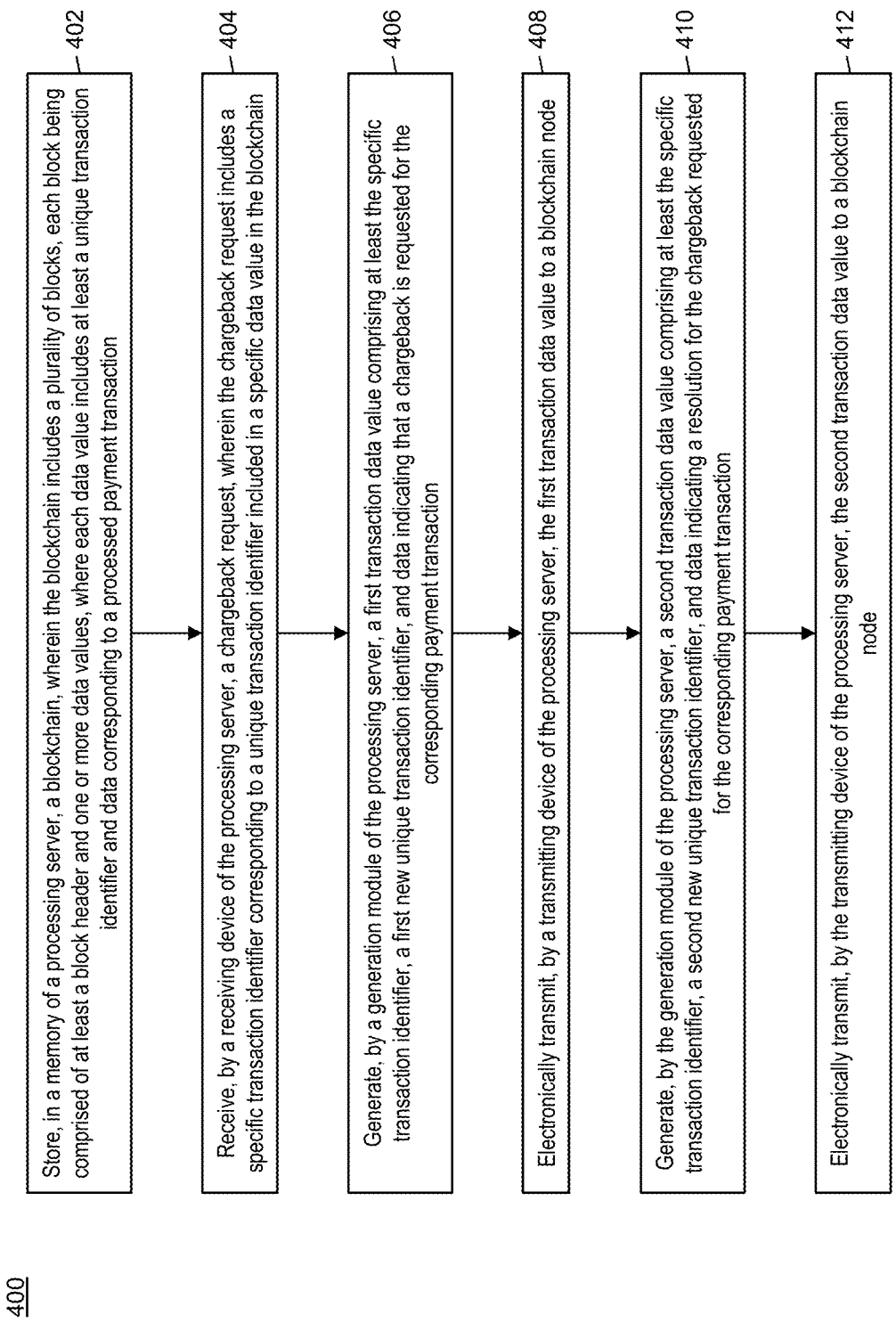
FIG. 4 is a flow chart illustrating an exemplary method for recording chargebacks in blockchain transactions in accordance with exemplary embodiments.

FIG. 4 illustrates a method 400 for the recording of data related to a requested chargeback for an electronic payment transaction in a blockchain.

In step 402, a blockchain (e.g., the blockchain 208) may be stored in a memory (e.g., the memory 206) of a processing server (e.g., the processing server 102), wherein the blockchain includes a plurality of blocks, each block being comprised of at least a block header and one or more data values, where each data value includes at least a unique transaction identifier and data corresponding to a processed payment transaction. In step 404, a chargeback request may be received by a receiving device (e.g., the receiving device 202) of the processing server, wherein the chargeback request includes a specific transaction identifier corresponding to a unique transaction identifier included in a specific data value in the blockchain. In step 406, a first transaction data value may be generated for the corresponding payment transaction by a generation module (e.g., the generation module 216) of the processing server, where the first transaction data value comprises at least the specific transaction identifier, a first new unique transaction identifier, and data indicating that a chargeback is requested for the corresponding payment transaction.

In step 408, the first transaction data value may be electronically transmitted by a transmitting device (e.g., the transmitting device 220) of the processing server to a blockchain node. In step 410, the generation module of the processing server may generate a second transaction data value comprising at least the specific transaction identifier, a second new unique transaction identifier, and data indicating a resolution for the chargeback requested for the corresponding payment transaction. In step 412, the second transaction data value may be electronically transmitted to the blockchain node by the transmitting device of the processing server.

In one embodiment, the second transaction data value may be generated after a predetermined period of time following receipt of the chargeback request. In a further embodiment, the first transaction data value may include a smart contract configured to instruct the generation module to generate the second transaction data value after the predetermined period of time. In some embodiments, the blockchain node may be associated with a second blockchain. In one embodiment, the first transaction data value and the second transaction data value may further include a blockchain identifier associated with the stored blockchain.

In some embodiments, the method 400 may further include receiving, by the receiving device of the processing server, a resolution notification, wherein the resolution notification includes the indicated resolution and at least one of: the specific transaction identifier and the first new unique transaction identifier. In a further embodiment, the resolution notification may be received from a transaction processing module (e.g., the transaction processing module 218) included in the processing server. In another further embodiment, the resolution notification may be received from a node associated with the blockchain and generated via execution of a smart contract included in the first transaction data value.

Computer System Architecture

Figure 5:
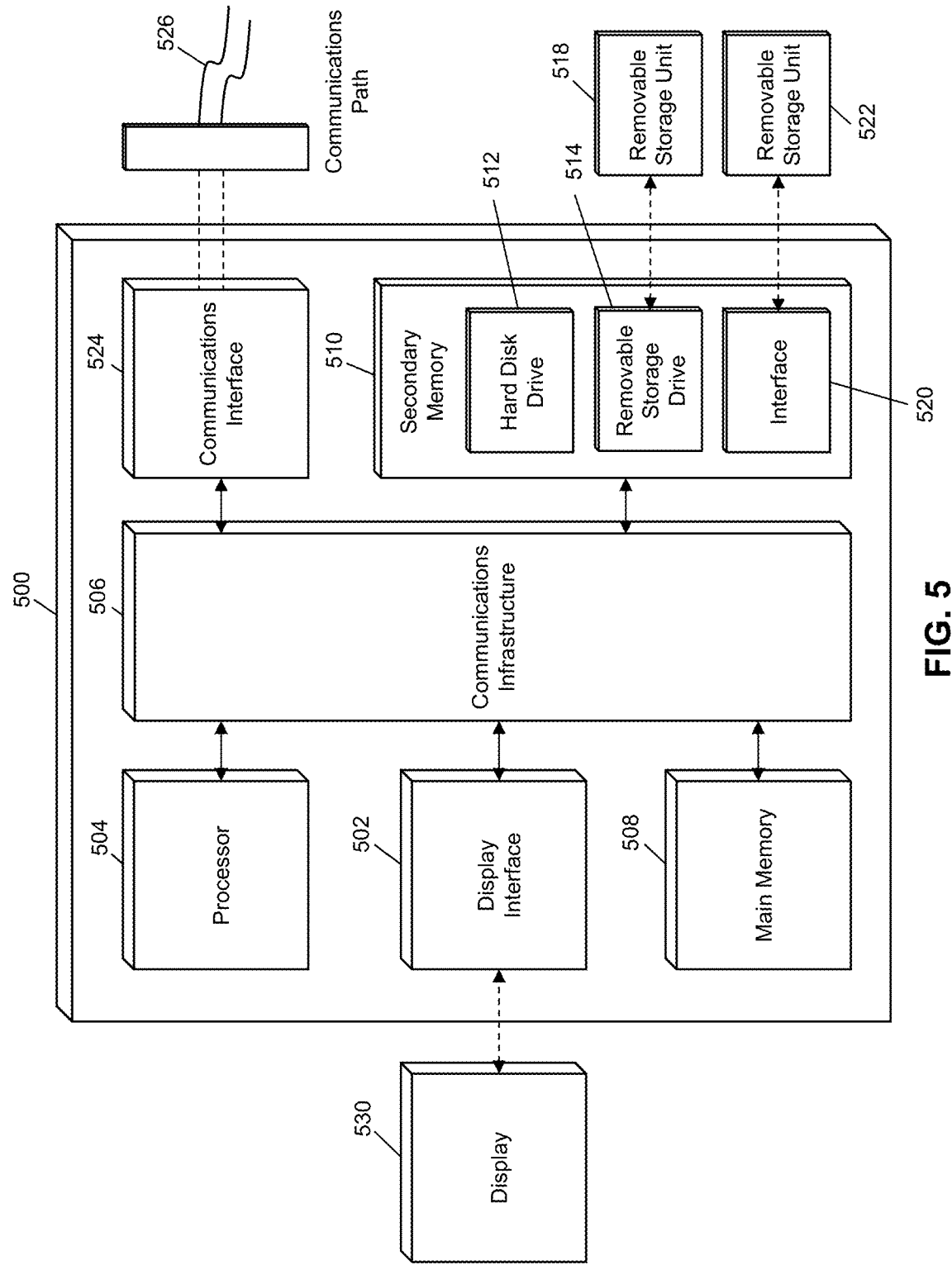
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for recording chargebacks in blockchain transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for recording chargebacks in blockchain transactions, comprising:
    storing, in a memory of a processing server, a blockchain, wherein the blockchain includes a plurality of blocks, each block being comprised of at least a block header and one or more data values, where each data value includes at least a unique transaction identifier and data corresponding to a processed payment transaction;
    receiving, by the processing server, a chargeback request, wherein the chargeback request includes a specific transaction identifier corresponding to a unique chargeback transaction identifier included in a specific data value in the blockchain;
    generating, by the processing server, a first transaction data value comprising at least the specific transaction identifier, a first new unique transaction identifier, and data indicating that a chargeback is requested for the corresponding payment transaction;
    electronically transmitting, by the processing server, the first transaction data value to a blockchain node;
    generating, by the processing server, a second transaction data value comprising at least the specific transaction identifier, a second new unique transaction identifier, the first transaction data value including data to instruct a smart contract configured on the processing server to generate and submit the second transaction data value to the blockchain node, and wherein the smart contract self-executes upon receipt of the chargeback request and when the smart contract does not self-execute upon receipt of the chargeback request after a predetermined period of time following receipt of the chargeback request, the second transaction data value indicates that the chargeback request has failed once the predetermined period of time has expired; and
    electronically transmitting, by the transmitting device of the processing server, the second transaction data value to the blockchain node.

2. The method of claim 1, wherein the second transaction data value includes data indicating a resolution for the chargeback requested for the corresponding payment transaction, and
    wherein the smart contract self-executes upon the resolution of the chargeback request and when the smart contract does not self-execute upon the resolution of the chargeback request after a predetermined period of time following receipt of the chargeback request, the second transaction data value indicates that the chargeback request has failed once the predetermined period of time has expired.

3. The method of claim 1, further comprising:
    receiving, by the processing server, a resolution notification, wherein the resolution notification includes the indicated resolution and at least one of: the specific transaction identifier and the first new unique transaction identifier.

4. The method of claim 3, wherein the resolution notification is received from the processing server.

5. The method of claim 3, wherein the resolution notification is received from a node associated with the blockchain and generated via execution of the smart contract included in the first transaction data value.

6. The method of claim 1, further comprising a second blockchain that stores chargeback requests separate from processed payment transactions.

7. The method of claim 1, wherein the first transaction data value and the second transaction data value further include a blockchain identifier associated with the stored blockchain.

8. The method of claim 1, further comprising:
    monitoring correspondence received by the processing server for a change in a data field upon a receipt of the resolution of the chargeback request by the processing server and causing the data value of the smart contract in the blockchain to self-execute upon the receipt of the resolution of the chargeback request.

9. The method of claim 2, wherein the resolution of the chargeback request includes denied chargeback requests and successful chargeback requests, the method further comprising:
  initiating a payment or refund for the successful chargeback requests, the payment or refund being separate from the electronically transmitting of the second transaction data value to the blockchain node.

10. The method of claim 1, further comprising:
  including a reason code for a denial of the chargeback request in the second transaction data value.

11. A system for recording chargebacks in blockchain transactions, comprising:
  a memory of a processing server configured to store a blockchain, wherein the blockchain includes a plurality of blocks, each block being comprised of at least a block header and one or more data values, where each data value includes at least a unique transaction identifier and data corresponding to a processed payment transaction; and
  a processor of the processing server, the processor configured to:
    receive a chargeback request, wherein the chargeback request includes a specific transaction identifier corresponding to a unique chargeback transaction identifier included in a specific data value in the blockchain;
    generate a first transaction data value comprising at least the specific transaction identifier, a first new unique transaction identifier, and data indicating that a chargeback is requested for the corresponding payment transaction;
    electronically transmit the first transaction data value to a blockchain node;
    generate a second transaction data value comprising at least the specific transaction identifier, a second new unique transaction identifier, the first transaction data value is data to instruct a smart contract configured on the processing server to generate and submit the second transaction data value to the blockchain node, and wherein the smart contract self-executes upon receipt of the chargeback request and when the smart contract does not self-execute upon receipt of the chargeback request after a predetermined period of time following receipt of the chargeback request, the second transaction data value indicates that the chargeback request has failed once the predetermined period of time has expired, and
    electronically transmit the second transaction data value to the blockchain node.

12. The system of claim 11, wherein the second transaction data value includes data indicating a resolution for the chargeback requested for the corresponding payment transaction, and wherein the smart contract self-executes upon the resolution of the chargeback request and when the smart contract does not self-execute upon the resolution of the chargeback request after a predetermined period of time following receipt of the chargeback request, the second transaction data value indicates that the chargeback request has failed once the predetermined period of time has expired.

13. The system of claim 11, wherein the processor of the processing server is further configured to:
  receive a resolution notification, wherein the resolution notification includes the indicated resolution and at least one of: the specific transaction identifier and the first new unique transaction identifier.

14. The system of claim 13, wherein the resolution notification is received from the processing server.

15. The system of claim 13, wherein the resolution notification is received from a node associated with the blockchain and generated via execution of the smart contract included in the first transaction data value.

16. The system of claim 11, further comprises a first blockchain that stores chargeback requests separate from processed payment transactions.

17. The system of claim 11, wherein the first transaction data value and the second transaction data value further include a blockchain identifier associated with the stored blockchain.

18. The system of claim 11, wherein the processor of the processing server is configured to:
  monitor correspondence received by the processing server for a change in a data field upon a receipt of a resolution of the chargeback request by the processing server and causing the data value of the smart contract in the blockchain to self-execute upon the receipt of the resolution of the chargeback request.

19. The system of claim 12, wherein the resolution of the chargeback request includes denied chargeback requests and successful chargeback requests, and wherein a payment or refund is initiated for the successful chargeback requests, the payment or refund being separate from the electronically transmitting of the second transaction data value to the blockchain node.

20. The system of claim 11, further comprising:
  including a reason code for a denial of the chargeback request in the second transaction data value.

* * * * *